May 23, 1967     T. R. NOLAN     3,320,958
SURGICAL CLAMP
Filed Feb. 25, 1964
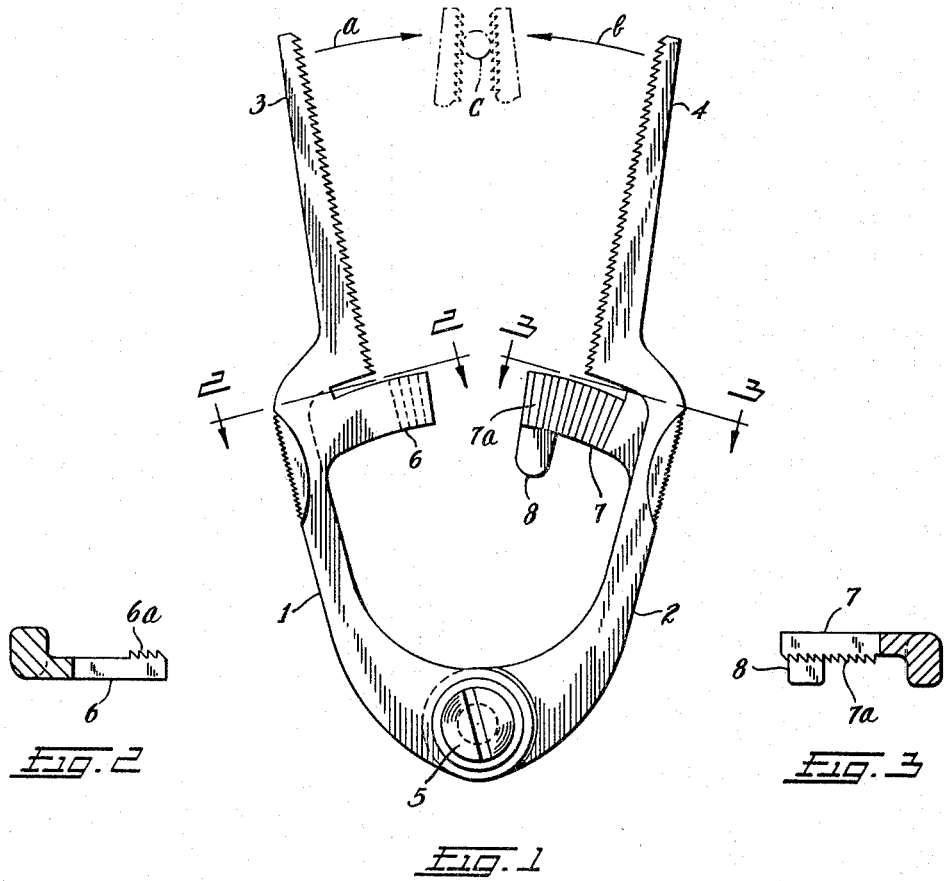
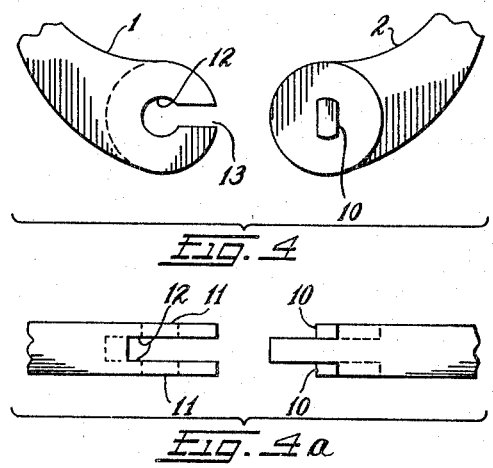
INVENTOR.
THOMAS R. NOLAN
BY
Oberlin, Maky & Donnelly
ATTORNEYS 3,320,958
SURGICAL CLAMP
Thomas R. Nolan, 45 Rumson Way NE.,
Atlanta, Ga. 30305
Filed Feb. 25, 1964, Ser. No. 347,204
2 Claims. (Cl. 128—346)

The present improvements, relating as indicated to clamps, have more particular regard, as further indicated, to clamps adapted for use in surgery, e.g. vascular clamps for closing off blood vessels or the like. However, it will be understood that no limitation to any such specific field of use is implied since at least certain features of improvement may be utilized in other types of clamp.

One object of the invention is to provide a clamp of simple construction (as indicated later it may consist of only two parts). A further object is to provide a clamp which may be held and manipulated by one hand of the user. Still another object is to provide a clamp which may be readily secured in adjustable closed position and may be equally readily opened to permit its disengagement from the part or object that is being clamped.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a plan view of my improved clamp, the parts being shown in open position with indication of the manner in which they may be closed;

FIG. 2 is a cross-section of one member of the clamp, the plane of the section being indicated by the line 2—2, FIG. 1;

FIG. 3 is a cross-section of a corresponding part of the other member of the clamp, the plane of such section being indicated by the line 3—3, FIG. 1;

FIG. 4 is a partial plan view showing an alternative construction of joint whereby the two members comprising the clamp may be hingedly connected together; and FIG. 4a is an end view of the same parts in such modified constructtion.

The clamp thus chosen for the purpose of illustrating the several improvements constituting the invention is a so-called vascular surgical clamp, the field of use for which has been sufficiently indicated in the introduction to this specification.

Referring to FIG. 1 of the drawing, such clamp will be seen to comprise two members 1 and 2 which are hingedly connected together at corresponding ends as by a pivot pin 5. The portions of the members adjacent such pivot will desirably be outwardly bowed so as more readily to permit the clamp to be held and manipulated in the manner presently to be described.

Extending outwardly from such bowed portions of the respective members and preferably offset inwardly with respect thereto are extensions 3 and 4 which, when the clamp is closed by moving said members as indicated by direction arrows *a*, *b*, will be brought into proximate, substantially parallel relation, as shown in dotted outline. It will be understood that in use the object *c* to be clamped will then be held between the inner faces of said extensions 3 and 4.

Preferably adjacent the point of juncture of its bowed portion with such outward extension thereof, the arms 1 and 2 are provided with inwardly directed projections 6 and 7, said projections being so disposed as to overlap each other when the members are brought into closed position by swinging movement about pivot 5. The opposed faces of said projections 6 and 7 are so formed that when said projections are brought into such overlapping relation, they will interengage and thus retain the outer portions or free ends of the arms in selected proximate, i.e., clamping, relation. As best shown in FIGS. 2 and 3, such interengaging means on projections 6 and 7 will conveniently take the form of opposed serrations 6a and 7a, respectively.

The two members or arms which comprise the clamp may be made of any suitable material, such as metal or plastic, but the material selected and the cross-section of the members should be such as to permit them to be sprung into and out of alignment, so that the projections 6 and 7 may be engaged or disengaged as desired. To facilitate such disengagement, one of said projections (projection 7 as shown) is formed with an extension 8 so located that the thumb of the user's hand, whereby the clamp is being held and manipulated, may press on such projection and thus readily swing the arms or members 1 and 2 sufficiently apart to effect disengagement of the projections.

Since where the clamp, as in the case of the one thus specifically illustrated and described, is designed for use in surgery, it is not only desirable but important that after each use the device should be thoroughly cleansed before reuse and that for this purpose the component parts should be readily separable. With this object in view, the form of pivotal connection between the two members of the clamp illustrated in FIGS. 4 and 4a will be preferably employed instead of the hinged connection illustrated in FIG. 1. In order to provide such alternative construction of hinge, the corresponding end of one of the members (member 2 as shown) is formed with oppositely directed oblong studs 10, 10, and the end of the other member is formed with apertured projections 11, 11, so spaced as to permit the aligned apertures 12, when the ends are assembled, to rotatably engage said studs 10, 10. To permit such engagement, as well as disengagement when desired, apertures 12 are formed with openings or slots 13 adapted, when longitudinally aligned with studs 10, to permit such assembly or disassembly, but only in one selected angular relation between arms 1 and 2, e.g. when the latter swung apart to lie at approximately right angles. Where the hinged connection between the members is of the foregoing construction, it will be seen the device comprises only two readily separable parts, each of which may be readily subjected to thorough cleansing and antiseptic treatment.

Other modes of applying the principle of the invention may be employed, change being made as regards the details described, provided the features stated in any of the following claims or the equivalent of such be employed.

I, therefore, particularly point out and distinctly claim as my invention:

1. A surgical clamp comprising a pair of arms hingedly connected together adjacent one end of each thereof for pivoting of the free ends of said arms into and out of proximate relation for releasably clamping objects therebetween, said arms being provided intermediate their respective ends with inwardly directed projection means having opposed serrations thereon which are adapted to be interengaged along their overlapped lengths for adjusting the spacing between said free ends, said arms being flexible toward and away from each other to permit engagement and disengagement of said serrations, and an extension on one of said projection means for the application of pressure to effect such disengagement of said serrations, the free ends of said arms being substantially straight and the intermediate portions of said arms from which said projection means are inwardly directed being outwardly bowed so as to confine said projection means between said arms when said free ends are in proximate relation as aforesaid.

2. A surgical clamp comprising a pair of arms hingedly connected together adjacent one end of each thereof for pivoting of the free ends of said arms into and out of proximate relation for releasably clamping objects therebetween, said arms being provided intermediate their respective ends with inwardly directed projection means having opposed serrations thereon which are adapted to be interengaged along their overlapped lengths for adjusting the spacing between said free ends, said arms being flexible toward and away from each other to permit engagement and disengagement of said serrations, the hinged connection between said arm comprising a pair of oppositely directed oblong studs projecting from said one end of one arm, and a pair of laterally spaced extensions on said one end of the other arm for receipt of said one end of said one arm therebetween, said extensions having aligned apertures therethrough in which said stubs are adapted to be rotatably received, and axial slots leading to said apertures for permitting insertion and removal of said studs from said apertures upon longitudinally aligning said oblong studs with said slots.

References Cited by the Examiner
UNITED STATES PATENTS

| | | | |
|---|---|---|---|
| 420,252 | 1/1890 | Siersdorfer | 24—258 |
| 643,003 | 2/1900 | Pollock | 128—346 |
| 1,983,969 | 12/1934 | Davis | 128—346 |
| 2,083,483 | 6/1937 | Strezoff | 81—416 |
| 2,685,880 | 8/1954 | Curutchet | 128—321 |

FOREIGN PATENTS

| | | |
|---|---|---|
| 12,829 | 9/1896 | Switzerland. |
| 138,245 | 1/1903 | Germany. |

RICHARD A. GAUDET, *Primary Examiner.*

D. L. TRULUCK, *Assistant Examiner.*